April 15, 1947.  R. P. PIPEROUX ET AL  2,418,900
METHOD OF AND APPARATUS FOR MAKING CUPS
Filed May 19, 1943  3 Sheets-Sheet 1
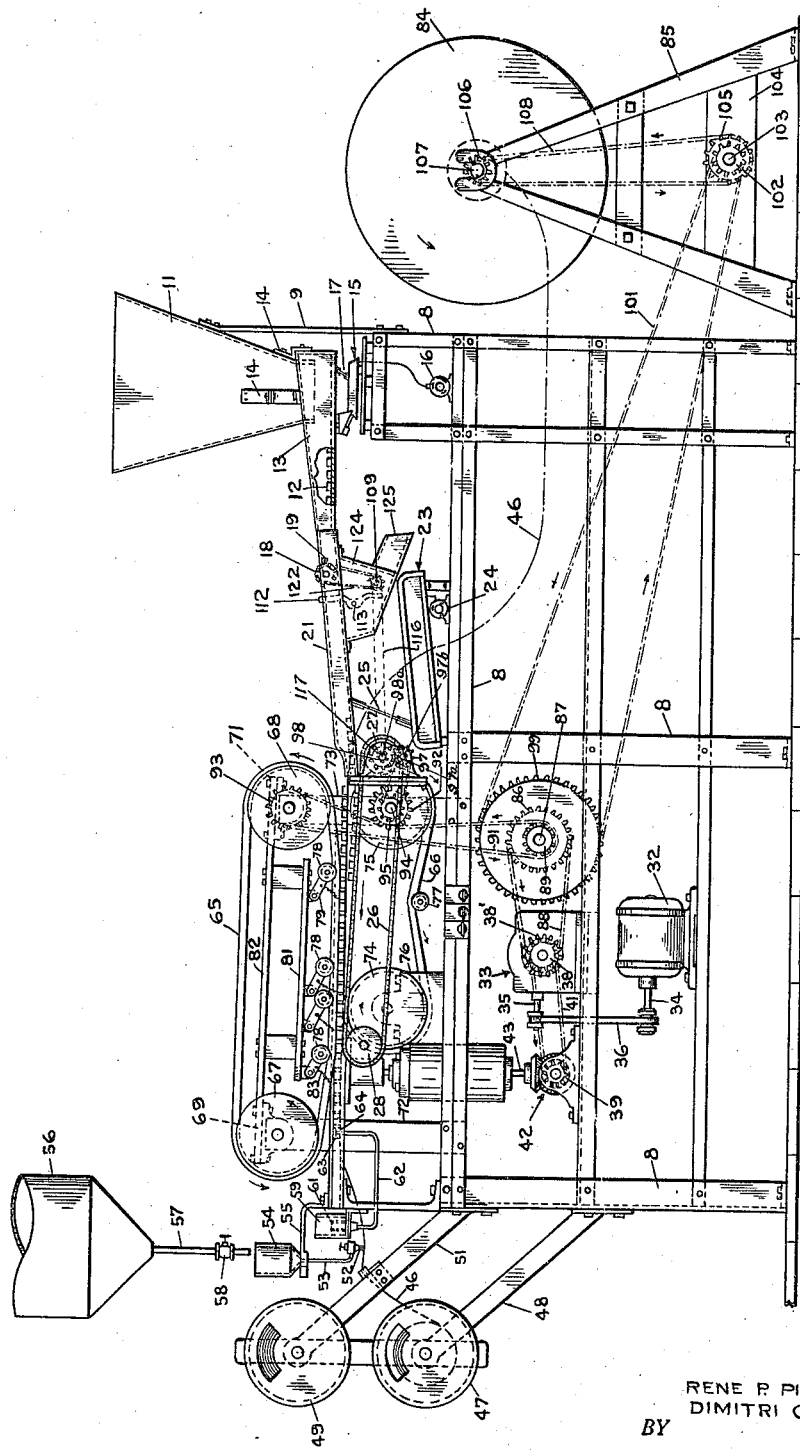
INVENTOR.
RENE P. PIPEROUX
DIMITRI G. SOUSSLOFF.
BY
ATTORNEYS.

April 15, 1947.  R. P. PIPEROUX ET AL  2,418,900
METHOD OF AND APPARATUS FOR MAKING CUPS
Filed May 19, 1943  3 Sheets-Sheet 2
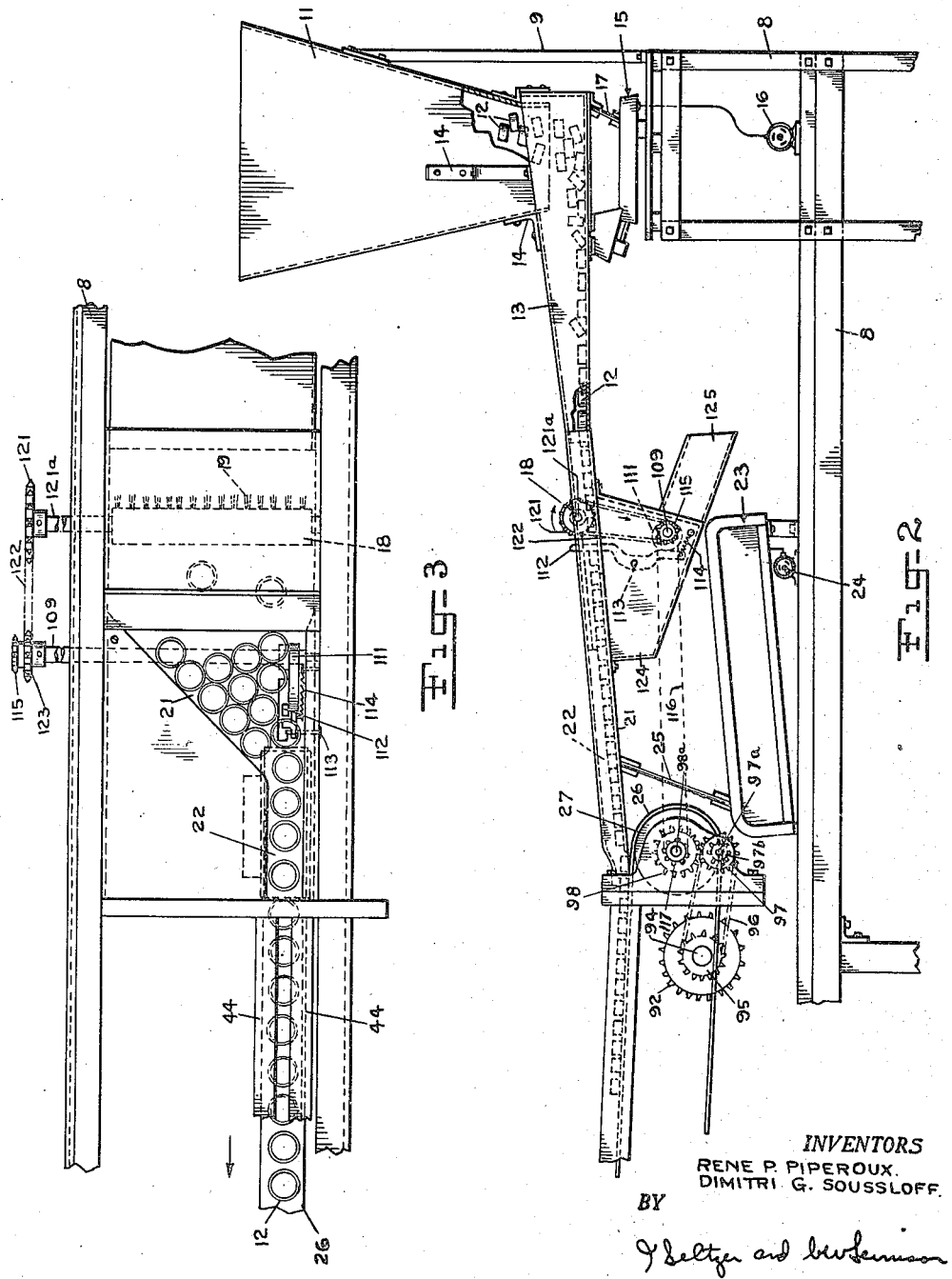
INVENTORS
RENE P. PIPEROUX.
DIMITRI G. SOUSSLOFF.
BY
ATTORNEYS.

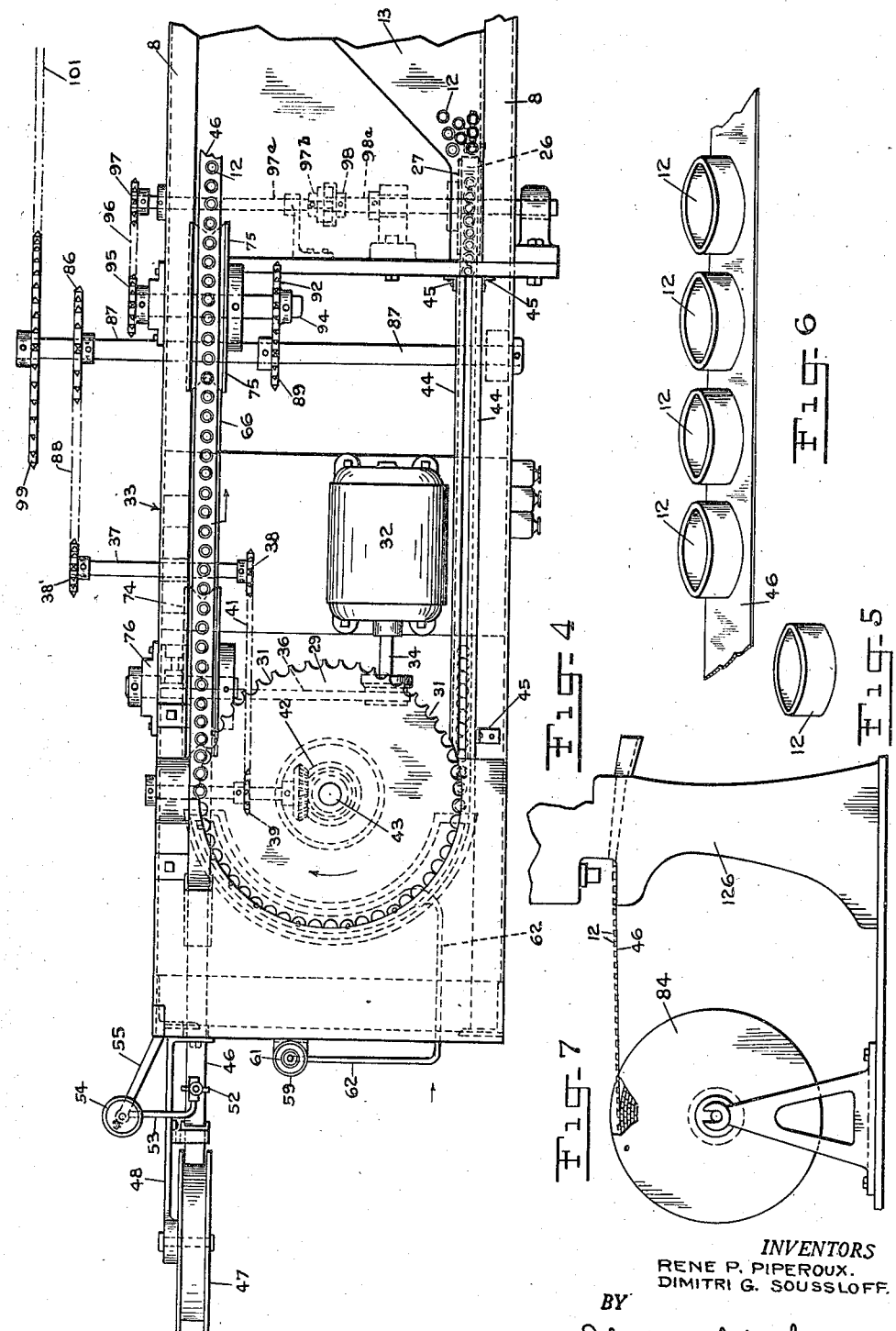

Patented Apr. 15, 1947

2,418,900

UNITED STATES PATENT OFFICE 2,418,900

METHOD OF AND APPARATUS FOR MAKING CUPS

Rene P. Piperoux, Radburn, N. J., and Dimitri G. Soussloff, New York, N. Y., assignor to Celanese Corporation of America, a corporation of Delaware Application May 19, 1943, Serial No. 487,596

19 Claims. (Cl. 93—36)

This invention relates to the manufacture of cups and like articles, and relates more particularly to the manufacture of cups from plastic material.

Cups and other containers of plastic material have heretofore been made by stamping the same from film, foil or sheets having a basis of plastic material by means of heat and pressure. This method of making cups and similar containers is known as stamp molding, and one such method is described in Patent No. 2,255,117. While satisfactory cups and other containers are made by this method, it is relatively slow, and can produce cups wherein the thickness of the walls differs little from the thickness of the bottom.

It is, accordingly, an important object of this invention to provide a simple and expeditious method and novel apparatus whereby cups and like containers may be produced in quantities at great speed and at low cost.

Another object of our invention is to provide a method and apparatus for producing cups or other containers wherein the thickness of the walls may be substantially different from that of the bottom.

In one aspect the present invention comprises feeding pieces of tubing, previously cut to the desired size, to a notched disc which feeds the cut pieces in predetermined spaced relationship to a strip of film or foil the upper surface of which has applied thereto a suitable cement, pressing said pieces on to said cement-coated film or foil so that the pieces become firmly attached thereto, and winding the strip on a suitable take-up roll. The film or foil carrying the pieces of tubing may be then fed to a suitable die stamping machine where the cups are cut from the film or foil. However, the strip fed to the die stamping machine and the cups may be cut from the strip without employing an intermediate take-up device. By employing tubes of substantial wall-thickness, and thin films or foils as the strips, cups or containers of relatively thick sides and relatively thin bottoms may be produced.

Other objects of this invention, together with certain details of construction and combinations of parts of our novel apparatus, will appear from the following detailed description.

In the drawings wherein a preferred embodiment of the apparatus of our invention is shown.

Figure 1 is a side elevational view of a machine for feeding pieces of tubing to a strip of film or foil to which they are adhesively attached in predetermined relationship, Figure 2 is a side elevational view, on an enlarged scale, of the mechanism for feeding the cut pieces of tubing to the feeding and spacing disc, Figure 3 is a top plan view, on an enlarged scale, of a portion of the machine shown in Figure 2, Figure 4 is a top plan view of a portion of the machine showing the spacing disc and the means for feeding the pieces of tubing to the strip of film or foil, Figure 5 is an enlarged view of a piece of tubing, Figure 6 is an enlarged detail view showing the pieces of tubing attached to the strip of film of foil, and Figure 7 is a detail view showing the feeding of the strip of film or foil having the pieces of tubing attached thereto to a die stamping machine to form the cups.

Like reference numerals indicate like parts throughout the several views of the drawings.

Referring now to the drawings for a detailed description of our invention, and particularly to Figure 1, the reference numeral 8 indicates a frame on which are mounted substantially all of the elements of the apparatus. Supported from frame 8, as by means of a bracket 9, is a hopper 11 for receiving the cut pieces of tubing, hereinafter referred to as tubes, such as is shown in Figure 5 and indicated by reference numeral 12, and also in Figure 6. The hopper 11 is provided at its lower end with an opening of suitable size through which the tubes are fed to a chute 13 which is attached to said hopper by means of brackets 14. A vibrator generally indicated by reference numeral 15 and operated by motor 16 is attached to the chute 13 by means of a metal strip 17. The vibrating motion prevents the jamming of the tubes in the opening of the hopper and aligns the tubes in a single layer along the bottom of the chute. The vibrating motion also assists in the feeding of the tubes to a brush 18 having a single line of bristles 19 which stirs up any accumulation of tubes that may occur and thus prevents the jamming of the tubes at their entry to the extension 21 of the chute 13, pushing them into a restricted portion 22 of said chute, which is only wide enough to receive a single line of tubes, as is shown in Figure 3. A vibrator generally indicated by reference numeral 23 and operated by motor 24 is attached to the extension 21 by means of a metal rod or strip 25. This vibrator also assists in the moving of the tubes into restricted portion 22 and on to an endless belt 26.

The endless belt 26 is carried on driven pulley 27 and idler pulley 28 and is adapted to be run at a speed which is slightly in excess of the peripheral speed of a disc 29 having notches 31 in the periphery thereof for the reception of the tubes for a purpose which will hereinafter be described. Both the driven pulley 27 and the disc 29 are driven by a motor 32 through a reducing gear generally indicated by reference numeral 33. The shaft 34 of the motor is connected to and drives the input shaft 35 of the reducing gear by means of a belt 36. The output shaft 37 has fixed thereto sprocket wheels 38 and 38', the sprocket wheel 38 being connected to and driving the sprocket wheel 39 by means of an articulated chain 41. The rotation of sprocket wheel 39 drives intermeshing beveled gears generally indicated by reference numeral 42 which, through shaft 43, rotate the disc 29. The sprocket wheel 38' drives the pulley 27 and thereby the belt 26 in a manner hereinafter described.

As is indicated above, from the restricted portion 22 of chute 13 the tubes 12 are fed on to the endless belt 26 which moves at a speed slightly in excess of the peripheral speed of the notched disc 29 and are moved thereby towards said disc between guard rails 44 attached to frame 8 by brackets 45. The higher speed of the feed belt 26 helps clear away any tubes at the lower end of chute 13 thus preventing any building up of the tubes along the chute, insures the entrance of a tube into each notch 31 of the disc 29 and "rushes" the tubes down the chute 13, compensating for any slight intermittent stopping of the shaker feed 21. The pitch of the notches on the disc is such that the spacing of the tubes on the strip of film or foil 46, on which they are to be adhesively attached, is effected.

The strip 46 is fed to the machine from a supply roll 47 which is rotatably supported on a bracket 48 attached to the frame of the machine. The second supply roll 49 is similarly mounted on a bracket 51 so that an immediate supply of the strip is available when the strip on the other supply roll gives out, the ends of the strip being cemented together to effect the continuous operation of the machine. The strip 46 is given a coating of a suitable cement prior to its entry into the machine. The cement is applied by means of a brush 52 to which cement is continuously supplied by means of a tube 53 leading from a container 54 mounted at the end of a bracket 55 fixed to the machine frame. The cement in the container is replenished when necessary from a tank 56 having a conduit 57 provided with a valve 58. The tank 56 is also employed to replenish the cement in container 59 which is provided with a level cup 61 for supplying cement through conduit 62 to a well 63. This well is preferably a narrow elongated depression in the surface of a table 64 over which the disc moves the tubes for feeding the latter to the cement-moistened strip. As the tubes are moved over the table 64 by the disc, cement from the well 63 is wiped on the lower periphery of said tubes. The moistening of both the surface of the strip aand the lower peripheral edge of the tube has been found to yield a better join. The cement is maintained at the desired level in the well 63 by the level cup 61.

As the strip 46 is fed at a tangent past the notched disc 29, the tubes are deposited thereon in predetermined spaced relationship. In order to start the welding operation between the tubes and the strip, there are provided two endless belts 65 and 66 which cooperate to press the strip and tubes therebetween during what may be called the preliminary setting period. These endless belts also act to feed the strip through the machine.

Belt 65 is supported on idler pulley 67 and driven pulley 68 which are journaled in bearing blocks 69 and 71, respectively, which are carried on standards 72 and 73, respectively, mounted on frame 8. Belt 66 is supported on idler pulley 74 and driven pulley 75, the former being journaled in bearing block 76 fixed to frame 8, and the latter being journaled in suitable bearings in standard 73. An idler pulley 77 which may be vertically adjustable is provided to maintain the belt 66 taut. Additional pressure on the tubes is provided by means of a series of rollers 78 carried at the ends of arms 79, which arms are pivotally attached to a bar 81 supported from a bracket 82 carried by the standards 72 and 73. Springs 83 attached to arms 79 and to the frame 8 cause pressure to be applied on the inner surface of belt 65 which pressure is in turn transmitted to the tubes 12 on the strip 46. After passing through the belts 65 and 66, the strip with the tubes cemented thereon proceeds for a distance exposed to the atmosphere in order to effect a drying of the cement (see Figure 1) and then is wound upon a reel 84 journaled in the ends of a standard 85.

The motor 32 operating through reducing gear 33 motivates the pressure belts 65 and 66 and reel 84, as well as the feed belt 26 and the notched disc 29 as indicated above. Thus, the sprocket wheel 38' on the output shaft 37 of the reducing gear 33 is connected to and drives sprocket wheel 86 on shaft 87 by means of an articulated chain 88. Also mounted on shaft 87 is a sprocket wheel 89 which, through articulated chain 91, drives sprocket wheel 92. The rotation of sprocket wheel 92 rotates pulley 75 and also the sprocket wheel 93 which effects a rotation of pulley 68. On shaft 94, to which the sprocket wheel 92 is attached, is fixed a sprocket wheel 95 which, through articulated chain 96, drives sprocket wheel 97 mounted on shaft 97a. This shaft also carries a gear 97b which meshes with and drives a gear 98 fixed to shaft 98a which also carries pulley 27, the driving pulley for belt 26.

On shaft 87 is also fixed sprocket wheel 99 which, through articulated chain 101, rotates the sprocket wheel 102 on shaft 103 supported in suitable bearings on a cross piece 104 on support 85. Also mounted on shaft 103 is a sprocket wheel 105 which is connected to sprocket wheel 106 on shaft 107 by means of articulated chain 108. Reel 84 being mounted on the shaft is rotated at a predetermined speed and takes up the strip 46 having the tubes 12 cemented thereto.

Means are provided for preventing the jamming of the tubes at the entrance of restricted portion 22 of the chute. Such means comprises a shaft 109 on which is mounted a cam 111. The rotation of the cam 111 causes the oscillation of a finger 112 pivoted at 113 which jostles the tubes into position. A spring 114 is employed to maintain the finger 112 in position against the cam 111. Shaft 109 is rotated by means of a sprocket wheel 115 which is connected by an articulated chain 116 to a sprocket wheel 117 which is fixed to shaft 97a.

The brush 18 is rotated from shaft 109 by means of sprocket wheel 121 on brush shaft 121a and articulated chain 122 connected to a sprocket wheel 123 on shaft 109. Means are also provided for catching any tubes which fall through the brush slot formed in chute 13. Such means comprise a chute 124 and auxiliary chute 125. A suitable receptacle may be placed under chute 125 to retain any tubes falling therein.

After the reel 84 is filled, it may be removed to a die stamping machine 126, such as is diagrammatically shown in Figure 7, where the cups are stamped out. In practice, a number of such reels are fed simultaneously to a gang die stamping machine.

In the structure outlined above, the production of from 350 to 400 cups per minute, depending on the size thereof, may be obtained.

The tubes 12 and strip 46 forming the cups may of course be of any suitable material. Our invention, however, lends itself advantageously to the production of cups from any plastic materials such as those, for example, having a basis of derivatives of cellulose such as cellulose esters like cellulose nitrate, cellulose acetate, cellulose propionate cellulose acetate-propionate or cellulose acetate-butyrate, or cellulose ethers, such as ethyl cellulose or benzyl cellulose, synthetic resins and synthetic linear polyamide condensation products.

Many variations in the construction of the cups or containers may be made. Thus the walls or sides may be made of one plastic, say having a basis of cellulose nitrate, and the bottom may be made of another plastic, say having a basis of cellulose acetate, or vice versa. As previously stated the walls or sides may be of one thickness and the bottom may be of another.

Obvious this invention may be applied to the production of any cylindrical or prismatic object hermetically sealed at one end thereof, which object may be of any desired size.

It is to be understood that the foregoing detailed description is given merely by way of illustration and that many variations may be made therein without departing from the spirit of our invention.

Having described our invention, what we desire to secure by Letters Patent is:

1. Process for making cups and similar articles, which comprises sealing one end of a tube by attaching thereto a strip of material having an area in excess of the area of said tube so that the end is completely closed, and removing the excess material.

2. Process for making cups and similar articles, which comprises sealing one end of a tube of plastic material by cementing said tube on to a strip of plastic material having an area in excess of the area of said tube so that the end is completely closed, and removing the excess material.

3. Process for making cups and similar articles, which comprises attaching the bases of a plurality of tubes in predetermined spaced relationship to a strip of material so that the attached bases are completely closed, and cutting said tube and base closing material from said strip to form cups.

4. Process for making cups and similar articles, which comprises cementing the bases of a plurality of tubes of plastic material in predetermined spaced relationship to a strip of plastic material so that the attached bases are completely closed, and cutting said tube and base closing material from said strip of plastic material to form cups.

5. Process for making cups and similar articles, which comprises feeding a plurality of plastic tubes, so that the bases thereof are in a horizontal plane, in predetermined spaced relationship to a cement-covered strip of plastic material, causing said tubes to adhere to said strip of material and cutting said tubes from said strip of plastic adjacent to the periphery of the bases of said tubes to form cups.

6. Process for making cups and similar articles, which comprises cutting tubes of predetermined size from a larger tube of plastic material, arranging said tubes so that the bases thereof are in a horizontal plane, feeding said tubes in predetermined spaced relationship to a cement-covered strip of plastic material, causing said tubes to adhere to said strip of material and cutting said tubes from said strip of plastic adjacent to the periphery of the bases of said tubes to form cups.

7. Apparatus for attaching tubes to a strip of material, comprising means for supplying a strip of material and means, including a disc having notches therein, for feeding tubes to said strip of material, the construction and arrangement of said feeding means are such that the tubes are deposited on said strip with their bases in a horizontal plane.

8. Apparatus for attaching tubes to a strip of material, comprising means for supplying a strip of material and means, including a disc having notches therein and rotatable in a horizontal plane, for feeding tubes to said strip of material, the construction and arrangement of said feeding means are such that the tubes are deposited on said strip with their bases in a horizontal plane.

9. Apparatus for attaching tubes to a strip of material, comprising means for supplying a strip of material, means for applying cement to said strip of material, and means for feeding tubes to said strip, the construction and arrangement of said feeding means are such that the tubes are deposited on said strip with their bases in a horizontal plane.

10. Apparatus for attaching tubes to a strip of material, comprising means for supplying a strip of material, means for applying cement to said strip of material, means for feeding tubes to said strip of material with the base of each of said tubes in a horizontal plane, and means for applying cement to the periphery of said base.

11. Apparatus for attaching tubes to a strip of material, comprising means for supplying a strip of material, means for applying cement to said strip of material, means for feeding tubes to said strip, the construction and arrangement of said feeding means are such that the tubes are deposited on said strip with their bases in a horizontal plane, and means for applying pressure on said tubes on said strip of material.

12. Apparatus for attaching tubes to a strip of material, comprising means for supplying a strip of material, means for applying cement to said strip of material, means for feeding tubes to said strip of material with the base of each of said tubes in a horizontal plane, means for applying cement to the periphery of said base, and means for applying pressure on said tubes on said strip of material.

13. Apparatus for attaching tubes to a strip of material, comprising means for supplying a strip of material, means for applying cement to said strip of material, means for feeding tubes to said strip, the construction and arrangement of said feeding means are such that the tubes are deposited on said strip with their bases in a horizontal plane, and means for applying pressure on said tubes on said strip of material, said means comprising two cooperating belts.

14. Apparatus for attaching tubes to a strip of material, comprising means for supplying a strip of material, means for applying cement to said strip of material, means for feeding tubes to said strip of material with the base of each of said tubes in a horizontal plane, means for applying cement to the periphery of said base, and means for applying pressure on said tubes on said strip of material, said means comprising two cooperating belts.

15. Apparatus for attaching tubes to a strip of material, comprising a hopper for holding a supply of tubes, a chute for receiving said tubes from said hopper, means for causing said tubes to assume a position whereby the bases thereof are in a horizontal plane, a rotatable disc having notches therein for receiving said tubes, means for feeding tubes to said notches, means for supplying a strip of material tangent to said discs, and means for applying cement to said strip, said disc being adapted to deposit said tubes in a predetermined spaced relationship on to said strip.

16. Apparatus for attaching tubes to a strip of material, comprising a hopper for holding a supply of tubes, a chute for receiving said tubes from said hopper, means for causing said tubes to assume a position whereby the bases thereof are in a horizontal plane, a rotatable disc having notches therein for receiving said tubes, means for feeding tubes to said notches, means for supplying a strip of material tangent to said discs, means for applying cement to said strip, said disc being adapted to deposit said tubes in a predetermined spaced relationship on to said strip, and means for applying pressure on said tubes on said strip.

17. Apparatus for attaching tubes to a strip of material, comprising a hopper for holding a supply of tubes, a chute for receiving said tubes from said hopper, means for causing said tubes to assume a position whereby the bases thereof are in a horizontal plane, a rotatable disc having notches therein for receiving said tubes, means for feeding tubes to said notches, means for supplying a strip of material tangent to said discs, means for applying cement to said strip, said disc being adapted to deposit said tubes in a predetermined spaced relationship on to said strip, and means for applying pressure on said tubes on said strip, said means comprising two cooperating belts.

18. Apparatus for attaching tubes to a strip of material, comprising a hopper for holding a supply of tubes, a chute for receiving said tubes from said hopper, means for causing said tubes to assume a position whereby the bases thereof are in a horizontal plane, a rotatable disc having notches therein for receiving said tubes, means for feeding tubes to said notches at a speed in excess of the peripheral speed of said rotatable disc, means for supplying a strip of material tangent to said discs, and means for applying cement to said strip, said disc being adapted to deposit said tubes in a predetermined spaced relationship on to said strip.

19. Apparatus for attaching tubes to a strip of material, comprising a hopper for holding a supply of tubes, a chute for receiving said tubes from said hopper, means for causing said tubes to assume a position whereby the bases thereof are in a horizontal plane, a rotatable disc having notches therein for receiving said tubes, means for feeding tubes to said notches at a speed in excess of the peripheral speed of said rotatable disc, means for supplying a strip of material tangent to said discs, means for applying cement to said strip, said disc being adapted to deposit said tubes in a predetermined spaced relationship on to said strip, and means for taking up said strip and having the tubes cemented thereon.

RENE P. PIPEROUX.
DIMITRI G. SOUSSLOFF.

REFERENCES CITED

The following references are of record in the file of this patent:

UNITED STATES PATENTS

| Number | Name | Date |
| --- | --- | --- |
| 1,750,943 | Schroeder | Mar. 18, 1930 |
| 1,832,321 | Owens | Nov. 17, 1931 |
| 303,600 | Abbott | Aug. 12, 1884 |
| 1,444,515 | McManus | Feb. 6, 1923 |
| 1,692,386 | Schmitt | Nov. 20, 1928 |
| 2,033,736 | Perryman | Mar. 10, 1936 |
| 2,232,783 | Hauscher | Feb. 25, 1941 |
| 1,987,185 | Dixon | Jan. 8, 1935 |

FOREIGN PATENTS

| Number | Country | Date |
| --- | --- | --- |
| 149,699 | British | Aug. 26, 1920 |